United States Patent
Strelzoff et al.

(10) Patent No.: US 11,886,445 B2
(45) Date of Patent: Jan. 30, 2024

(54) CLASSIFICATION ENGINEERING USING REGIONAL LOCALITY-SENSITIVE HASHING (LSH) SEARCHES

(71) Applicant: United States of America as Represented by The Secretary of The Army, Alexandria, VA (US)

(72) Inventors: Andrew P Strelzoff, Vicksburg, MS (US); Ashley N Abraham, Vicksburg, MS (US); Althea C Henslee, Vicksburg, MS (US); Haley R Dozier, Vicksburg, MS (US); Mark A Chappell, Vicksburg, MS (US)

(73) Assignee: UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 0 days.

(21) Appl. No.: 17/361,776

(22) Filed: Jun. 29, 2021

(65) Prior Publication Data
US 2022/0414108 A1    Dec. 29, 2022

(51) Int. Cl.
*G06F 16/2457*    (2019.01)
*G06F 16/29*    (2019.01)
*G06F 16/9537*    (2019.01)

(52) U.S. Cl.
CPC ........ *G06F 16/24578* (2019.01); *G06F 16/29* (2019.01); *G06F 16/9537* (2019.01)

(58) Field of Classification Search
CPC .. G06F 16/24578; G06F 16/285; G06F 16/29; G06F 16/35; G06F 16/355;
(Continued)

(56) References Cited

U.S. PATENT DOCUMENTS 8,363,961 B1 *    1/2013    Avidan ................. G06K 9/6218
                                                                    707/747
8,370,338 B2 *    2/2013    Gordo .................. G06F 16/583
                                                                    707/723
(Continued)

FOREIGN PATENT DOCUMENTS

WO    WO-2018048853 A1 *    3/2018    ......... G06F 16/9535

OTHER PUBLICATIONS

Matsui et al, Reconfigurable Inverted Index, Oct. 2018, ACM, pp. 1715-1723 (Year: 2018).*
(Continued)

*Primary Examiner* — Kimberly L Wilson
*Assistant Examiner* — Cheryl M Shechtman
(74) *Attorney, Agent, or Firm* — Brian C. Jones

(57) ABSTRACT

An example method of performing searches by comparing regions includes identifying a search point contained in geo-located data. The search point is nearest in distance to a query location. A search region associated with the search point is determined. The search region includes neighbor points contained in the geo-located data that are nearest the search point. Centroids corresponding respectively to the plurality of neighbor points of the search region are determined. The centroids of the search region are compared to other centroids corresponding to other regions of the geo-located data. The number of other centroids that match with the plurality of centroids are counted, and the counts are placed in descending order, to list the other regions having the highest similarity first. An ordered list of the other regions is generated based on their respective similarities to the query region.

20 Claims, 8 Drawing Sheets

(58) Field of Classification Search
CPC .... G06F 16/9537; G06K 9/00; G06K 9/6201; G06K 9/6215; G06K 9/6217; G06K 9/6218; G06K 9/6232; G06K 9/6247; G06K 9/6267; G06K 9/627; G06K 9/6272; G06K 9/6274; G06K 9/6276; G06V 10/10; G06V 10/20; G06V 10/70; G06V 10/75; G06V 10/761; G06V 10/762; G06V 10/764; G06V 10/7715; G06V 30/1908; G06V 30/191; G06V 30/19007; G06V 30/19093; G06V 30/19107; G06V 30/19127; G06V 30/19173; G06N 20/00

See application file for complete search history.

(56) References Cited

U.S. PATENT DOCUMENTS

| | | | |
|---|---|---|---|
| 8,705,870 B2* | 4/2014 | Wang | G06F 16/583 |
| | | | 382/173 |
| 9,367,763 B1* | 6/2016 | Gordo Soldevila | G06F 16/50 |
| 10,255,323 B1* | 4/2019 | Guo | G06F 16/24561 |
| 2006/0101060 A1* | 5/2006 | Li | G06F 16/90335 |
| | | | 707/E17.02 |
| 2013/0039569 A1* | 2/2013 | Kashiwagi | G06K 9/6247 |
| | | | 382/154 |
| 2013/0254191 A1* | 9/2013 | He | G06F 16/583 |
| | | | 707/728 |
| 2014/0229473 A1* | 8/2014 | Mehrotra | G06F 16/3347 |
| | | | 707/780 |
| 2015/0049943 A1* | 2/2015 | Hamsici | G06F 18/2415 |
| | | | 382/218 |
| 2018/0101570 A1* | 4/2018 | Kumar | G06F 17/10 |
| 2021/0026877 A1* | 1/2021 | Ganguly | G06K 9/623 |

OTHER PUBLICATIONS

Chen et al, Hierarchical quantization for billion-scale similarity retrieval on GPUs, Jan. 2021, Elsevier, pp. 1-13 (Year: 2021).*

Wang et al, Hashing for Similarity Search: A Survey, Aug. 2014, pp. 1-29 (Year: 2014).*

* cited by examiner

CLASSIFICATION ENGINEERING USING REGIONAL LOCALITY-SENSITIVE HASHING (LSH) SEARCHES

FIELD OF THE TECHNOLOGY

The present disclosure relates generally to performing regional comparisons efficiently.

BACKGROUND

Various applications need to perform comparisons. For example, soil data is compared to determine if one point of soil is similar to another point of soil. Unlabeled soil data can be modeled via the common linearly decomposed principal component analysis (PCA), and then clusters of data can be identified using a simple method such as K-means. Often times, PCA provides marginal separation of the soil data, so that fuzzy or "soft" K-means clustering may be preferred over "hard" K-means for labeling populations. In an example, fuzzy k-means is used on soil data in an attempt to discriminate poorly resolved populations resulting from linear decomposition and PCA modeling. However, PCA assumes linear relationships in the data and for highly non-linear soil data use of PCA results in loss of information and unacceptable round-trip accuracy. Product Quantization (PQ), which is a technique developed for signal processing, is able to achieve simultaneous dimension reduction and classification without linearization. In addition, PQ provides pipeline customization by allowing choice of 'code size' and 'number of subspaces' with measurable roundtrip error. The examination and customization to the PQ pipeline for a specific dataset and application is key to achieving 'Classification Engineering,' the development of a classification system which best meets the SME requirements for roundtrip accuracy and application performance. In this case application performance is an appropriate number of query returns for targeted regional similarity searches with the best possible round-trip error.

Soil taxonomy systems provide highly discriminating labeling systems for describing field soils. Soil morphological labels are largely determined from the distribution of distinct surface and subsurface features of the profile coupled with a select range of physical and chemical properties. As highly specialized, morphologically-based systems, soil taxonomic systems can be difficult to employ in practice for three main reasons. First, the terminology and defining criteria are largely inaccessible to non-experts in Soil Science. Even within Soil Science, soil taxonomic systems can be confusing to experts lacking extensive training in pedology. Second, different countries employ a variety of soil taxonomic systems. The best example arises in North America, where the U.S. and Canadian soil taxonomic systems are completely different in terms of designations and criteria. To this point, no global soil taxonomy systems exist for soils around the world. Therefore, global communication of soil "types" is limited unless referring to one of the better-known U.S.-based Soil Taxonomy (ST) or World Reference Base (WRB) systems. However, communication focused through these more common systems can be hindered by the lack of appropriate criteria describing a particular region of interest. For example, the ST system is particularly limited in the description of tropical soils, given the limited occurrence of these environments within the states and territories of the United States. The third reason against the practical use of morphologically based soil taxonomy systems is that this information is restricted by most nation states. The detail inherent within a morphologically based soil taxonomic system is sufficient to reveal the underlying weaknesses and vulnerabilities of a country's agricultural industry and infrastructure. Thus, this information is considered sensitive by most nations and restricted to certain groups within the individual governments. Some research agencies and consortiums have successfully obtained global soil information only after signing non-disclosure agreements prohibiting the open release of this data.

SUMMARY

In an embodiment, a non-transitory computer readable medium has instructions stored thereon executable by a processor to identify a search point contained in geo-located data. The search point is nearest in distance to a query location. A search region associated with the search point is determined. The search region includes neighbor points contained in the geo-located data that are nearest the search point. Points have data associated with them which have previously been assigned a PQ pipeline based on classes. A class is a set of subspace centroids. The set of PQ point classes in the region is compared with all other regions to find similar regions utilizing the LSH regional search heuristic. The number of subspace centroid matches are counted-and the counts are placed in descending order, to list the other regions having the highest similarity first. An ordered list of the other regions is generated based on their respective similarities to the query region.

In another embodiment, a method of performing searches by comparing regions includes identifying a search point contained in geo-located data. The search point is nearest in distance to a query location. A search region associated with the search point is determined. The search region includes neighbor points contained in the geo-located data that are nearest the search point. Points have data associated with them which have previously been assigned a PQ pipeline based on classes. A class is a set of subspace centroids. The set of PQ point classes in the region is compared with all other regions to find similar regions utilizing the LSH regional search heuristic. The number of other centroids that match with the number of subspace centroid matches are counted, and the counts are placed in descending order, to list the other regions having the highest similarity first. An ordered list of the other regions is generated based on their respective similarities to the query region.

BRIEF DESCRIPTION OF THE DRAWINGS/FIGURES

DETAILED DESCRIPTION

Figure 1:
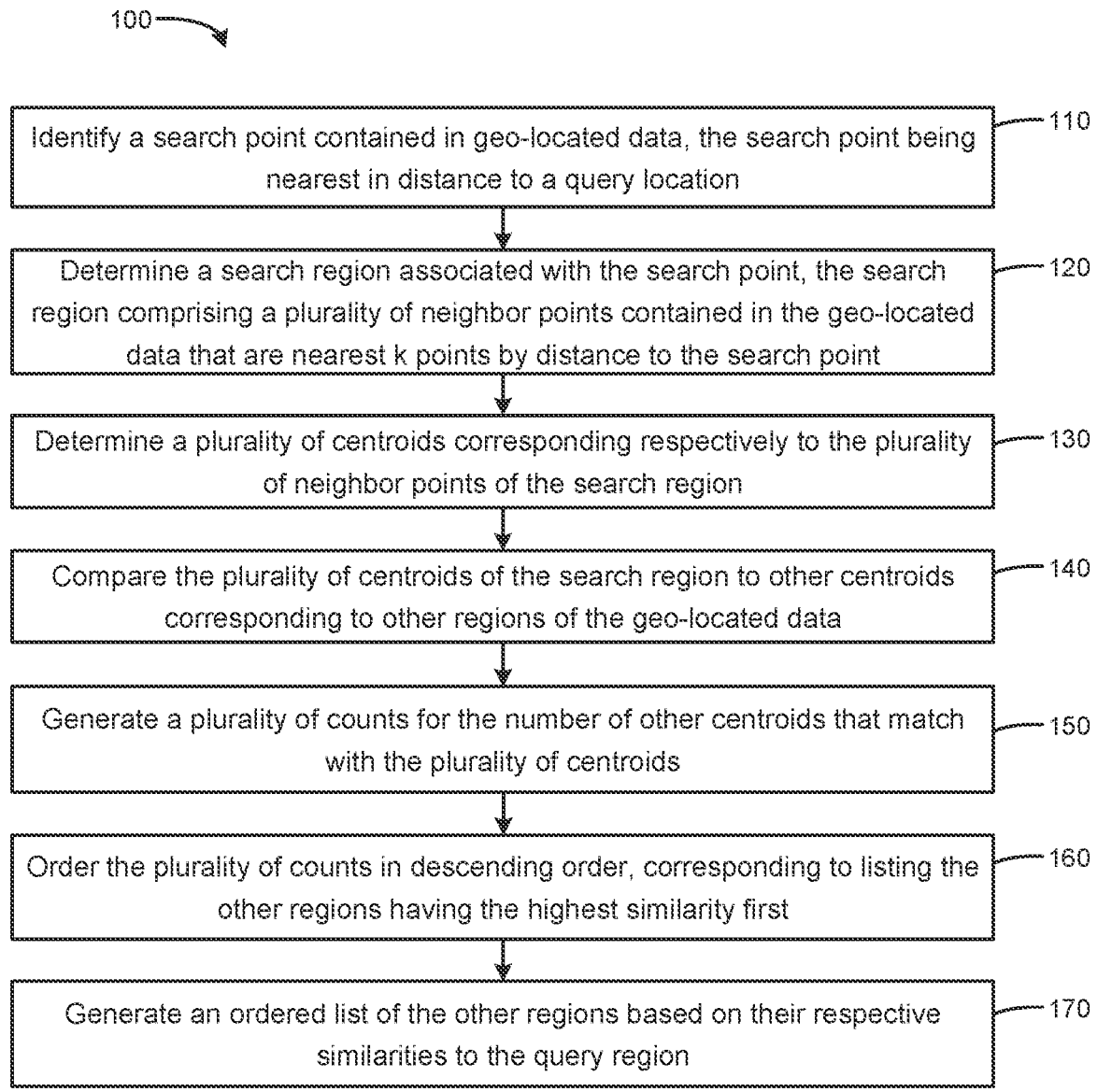
FIG. 1 is a flow chart based on comparing regions according to an example.

The use of Machine Learning (ML) techniques has allowed rapid advancements in many scientific and engineering fields. In many geoscience research areas, there is a significant barrier in finding cutting-edge, yet appropriate techniques to solve long-standing problems. One of these problems is that of surface soil classification, a research area hindered by the reliance on human-derived classifications, which are mostly dependent on dividing a dataset based on field-observable morphological descriptions and limited chemical and physical characterization data rather than statistically observable similarities. However, the embodiments described herein may be used for many different applications. Soil is provided as an illustrative example application, and the embodiments are not limited to soil applications and can be applied particularly to data that includes geo-located information.

Soil behavior is difficult to predict. Before a construction project is started, there is uncertainty predicting how construction materials and soil will behave or interact. Embodiments described herein are applicable to many different fields and situations. For example, embodiments enable knowledge to be gained about soils, by finding similar soil locations. For example, if access is not available to a site or on-site materials, embodiments can find another site elsewhere in the world where the soil would be similar. With confidence, the tools described herein enable the extrapolation of lab data or other information from the similar site to the site of interest. There are various approaches to find matches in data. However, embodiments described herein enable vast amounts of data to be searched and compared efficiently, e.g., based on LSH technology. Furthermore, regional LSH technology described herein enables sophisticated regional searches, thereby providing greater benefits compared to point-to-point searches.

Classifying and comparing soils poses particular challenges, because soils vary on different length scales. Soil data is available that characterizes soils around the world, but such data is incomplete. Interpolated soil data is available, which calculates and interpolates likely soil conditions on a geoscape grid and gives soil properties according to the interpolated grid. However, such available soil knowledge is not well organized. The application of that knowledge is therefore difficult to manage. Embodiments described herein leverage machine learning to help manage seemingly intractable data such as soil knowledge, to find similarities between regions (not just individual points) around the world.

Embodiments are applicable to many different kinds of data sets, by quantifying or characterizing spots or areas, searching for patterns and neighborhoods, areas, or regions. In a soil context, finding similar areas gives an idea of how an area will behave, such as the geology around the similar area compared to known areas. The similarity searching provides a basis for matching and comparing information and sites, comparing sites that are known to destination sites under consideration.

Other applications for the embodiments described herein include the domains of energy weapons, audiology, real estate, and so on. Energy weapons emit energy signatures. Embodiments can search for, e.g., a similar microwave energy weapon signature. Such energy information can be recorded using columns of data with rows of characteristics, where a family of energies represents the weapon's energy signature. Embodiments can search for that signature signal in a collection of signals that have been gathered or simulated. Embodiments can provide the intelligence community with the ability to search through a large set of data and possible matches, to find areas of similarities quickly and efficiently.

Microwave sensors are used to identify energy signals. The sensors can obtain many measurements, including some that are precise and higher quality, and others that are affected by interference or other noise. Accordingly, embodiments described herein can use multiple signals when searching or comparing. Using an individual signal to compare might provide undesirable results, or not result in a match when comparing to known signals, if the single signal is affected by interference or noise and the like. However, embodiments can use multiple signals measured by a sensor, which is analogous to a region search as described herein. Performing such region-based comparisons enables embodiments to find matches using sensors in challenging environments, such as urban environments or other areas having a mixture of signals. The embodiments can consider a package of signals that are sensed during a similar timeframe and are therefore likely related. That package can be used as a query to search for other similar packages of signals, which may be related to the query package. Thus, embodiments enable more sophisticated searching and can perform likely successful searches based on a package of signals (analogous to a query region of data points), compared to searching individually for a single signal that may not be easily found.

Embodiments also can be used in the domain of audiology, for analyzing verbal speaking or other audio signals. Embodiment can perform a post-processing analysis of a given voice pattern, and search through a data set of, e.g., many people talking over each other. Embodiments can search through such multiple signals received at the same time, to find matches between voices.

Embodiments may be used to search and compare real estate, such as houses for sale. The properties of a query for a house can include number of floors, number of rooms, and the like. Embodiments can search for such collections of properties describing search houses from among a dataset of houses. Furthermore, embodiments can search for properties shared by multiple houses of a neighborhood, e.g., treating a neighborhood of houses as a query region.

The embodiments described herein excel at complex analyses, particularly where a single point comparison approach would lead to undesirable results. Soil is complex, and not uniform across a given geography. Searching a single point may result in a 50% chance of obtaining a bad result or noise, particularly where soil composition is complex or unusual. Point searches result in large amounts of noise when performed in the context of unique or odd applications. In contrast, the embodiments described herein perform regional searches, to consider larger regions (e.g., performing a search using 1000 data points) when searching, thereby obtaining sensible results even in applications that are unpredictable, non-uniform, and complex.

Using Machine Learning techniques for classification allows researchers to move beyond the limitations of human visualization and offers avenues into the classification of high-dimension datasets with a much higher level of specificity than previously possible with hand-drawn taxonomies. In surface soil classification, the higher level of specificity achieved using some machine learning approaches allows the identification of similar regions with much narrower margins. The machine learning pipeline described herein combines product quantization with the systematic evaluation of parameters and output to get the best available results. For example, embodiments can provide a machine learning-based surface soil classification system with well-bounded, 98% root mean square error. Such embodiments can perform regional analog searches.

The following terminology is used, and exemplary meanings are provided for clarification.

Geolocated data is data that contains latitude and longitude information.

Hashing is a function that converts one value to another.

K Nearest Neighbors (K_nn) is a predefined classification method that groups data based on the points that are deemed closest by a given distance metric (usually Euclidean).

Locality Sensitivity Hashing (LSH) is a predefined method that converts similar data into the same groups with a high probability.

Product Quantization (PQ) is a predefined, Machine-Learning process that clusters data points and applies labels based on the clustering. PQ is utilized in processing pipelines to create, e.g., soil taxonomies through clustering the geolocated data points.

Reconfigurable Inverted Index (Rii) is a predefined method for approximate nearest neighbor search which is both computationally fast and memory-efficient.

Embodiments enable a soil labeling system using machine learning approaches. Such a system can make use of a global database of soil characteristics. While this information is not available due to the previously described restrictions, there do exist interpolated global soil characterization data sets that can be used for this purpose. By applying the latest Machine Learning clustering approaches to an interpolated soil dataset, embodiments provide a soil taxonomy that is easily and quickly replicable, and one that does not rely as heavily on time-consuming field experts. Clustering is a highly-studied and well-understood Machine Learning problem, and many software packages already exist for implementation. Using Machine Learning technology also avoids bias of field expert reliance on historical, geographic understandings, depending instead on statistically observable similarities.

There are challenges in applying Machine Learning approaches to the development of a soil taxonomy that must be overcome. Soil datasets are expected to exhibit high dimensionality to optimize the specificity of the derived soil classification labeling system. Traditional Machine Learning classification or clustering techniques often fail when presented with a high dimensional dataset due to a phenomenon often called The Curse of Dimensionality. This phenomenon refers to the computational expense of dealing with spatially large data and the fact that the similarity measures often used in ML algorithms do not behave in the same manner in higher dimensions. That is, in high-dimensional spaces the concept of proximity (or similarity) may not be as quantitatively meaningful as observed in low-dimensional space.

A dimension reduction technique may be used to classify, cluster, or categorize high-dimensional data. Steps may be individually computationally expensive, and benefit from experimentation through hyperparameter tuning to find optimal settings. For researchers working with large datasets, the runtime and memory usage of these methods can be prohibitive or even intractable, severely limiting the ability of researchers without access to HPC systems. A challenge for traditional methods of labeling high-dimension data is the loss of the original data. When working with sensor-based data, the ability to return to the original data is valuable. However, as the data is transformed with dimension reduction, a connection to the original data is not maintained.

Embodiments proposed herein may use Product Quantization to develop a Machine Learning-based, high fidelity classification engineered system for surface soil worldwide while also addressing the key challenge of the high dimensional nature of the dataset, including the difficulties and computational expense of classification.

Quantization is a method that maps values from a large data set to values in a smaller, countable (finite) data set using a function known as a quantizer. Traditional quantization techniques are non-linear in nature, and therefore do not preserve the ability to recover input values. An example of such a quantizer is the k-means algorithm where the vector can be represented as the centroid of similar high dimensional data. This process allows us to store or represent each vector in the data set by the label of its centroid in an efficient manner (log k bit per vector).

There are many advantages and disadvantages to this approach of creating a low-dimensional representation of a vector. As discussed in the previous paragraph, the most obvious advantage to quantization is that the reduced size of the data can drastically increase computational efficiency. Disadvantages of many quantization methods include the fact that the process of quantization is inherently non-linear and therefore traditionally irreversible. That is, once a lower dimensional representation is reached, the higher dimensional representation cannot be recovered.

To combat the limitations of traditional quantization, labeling, and querying methods, this study explores the use of the vector quantization technique, known as Product Quantization (PQ). PQ addresses the limitations of Machine Learning in clustering high dimensional datasets by accomplishing dimension compression and then applying clustering and retaining a means to calculate a roundtrip error rate using the root mean squared error (RMSE):

$$RMSE = \sqrt{\frac{1}{n}\sum_{i=1}^{n}(y_i - \hat{y}_i)^2} \quad (1)$$

where $y_i$ represents the $i^{th}$ row vector in the original data set, $\hat{y}_i$ represents the reconstructed row vector, and n represents the total number of vectors in the dataset. Product quantization packages, such as NanoPQ or Facebook AI Similarity Search, also preserve a way to reconstruct the original data with low error.

By using Product Quantization, the computational expense is greatly reduced by decomposing the dataset's features into lower dimensional spaces called subspaces, then quantizing and collapsing the reference set into a smaller collection of representative vectors, or centroids. The collection of centroids associated with the subspaces are represented with a specific combination of codewords used to identify each data point with its appropriate cluster. These centroids and the vectors associated with each subspace are also held in the inverted index, which allows the identification of approximate nearest neighbors.

Examples described herein enable Secure Multi-party Product Quantization (SMPQ). In the soil domain, there can be legal and security barriers to sharing data, such as when sharing access to data between parties such as different countries. There has been a risk, overcome by the present embodiments, that shared machine language products can enable a given party to recover data that another party would like to keep private. For example, a machine learning product would be used by each party via a model. However, the model for the machine learning product might also be used by a party to recover the private data. The present embodiments avoid such problems by allowing searching across shared data, while keeping each party's data private and preventing such data recovery.

Partners can hold datasets across which the partners want to perform searching. Different partners can hold different data, which those partners may want to keep private. The embodiments described herein, which enable regional LSH searching, also can be used in methodologies in multi-party computation, an emerging area in computer science and data science. Such embodiments allow different entities to cooperate in machine learning while keeping their respective data private, based on regional LSH. In an example, a jointly created version of regional LSH is used by multiple parties. Each party holds private data, yet each party can ask questions about whether a party has data that is sought. The model returns a question and follow-up for that data which is being sought. Embodiments allow many partners to participate, allowing access to the system to ask a limited but reasonable number of questions. The system allows access to the data to those who need the access, while not broadcasting to all partners that a given party needs a particular type of access. Embodiments can use homomorphic encryption, e.g., to provide secure multi-party communication, such as by encrypting the system's model or by using encrypted inputs and encrypted outputs. This enables parties to know whether it is worth obtaining each other's data, without needing to disclose private data.

Embodiments can use various types of model developments. A federated model development enables parties to encrypt their data. Embodiments apply machine learning to the encrypted data, resulting in an encrypted product quantization model. Various use cases may be employed.

In a first use case, a shared SMPQ index with open queries is supported. However, open queries may be politically or militarily sensitive. In a second use case, a shared SMPQ index with encrypted queries is supported. The use of encrypted queries hides the nature of the query. However, unlimited queries enable an adversary to reverse engineer the source data. Although a query cap can be used to hinder such attempts, the query cap may be a barrier in an emergency. In a third use case, a shared SMPQ index with "metric-poisoned" encrypted regional LSH queries is supported. Metric poisoning involves collaborators secretly selecting differing metrics, which enables a very high query cap. The regional LSH provides fast categorical region similarity search. In a population within numeric bounds, a metric space is established including multiple categorical values. Unlike an individual comparison (which can be misleading), the regional LSH allows for the quick finding of most similar populations.

The soil dataset used for an example application was obtained using an interpolated soil database published by the International Soil Reference and Information Centre (ISRIC). This data set was interpolated using the raster package built for R programming language via the RStudio interactive user interface. Here, individual geo-referenced rasters published by ISRIC containing various interpolated global soil characteristics were sampled at three different soil depths (0, 5, and 15 cm) against approximately 10 million randomly generated geospatial coordinates, and combined into a single dataframe. Afterward, the data frame was preprocessed by removing rows with missing data (NANs) and negative values, and rows with duplicate geospatial coordinates. Using the "over" command in the raster package, the dataset was further trimmed using a shapefile containing the global land mass boundaries to remove any rows containing erroneous geospatial coordinates. The final dataset contained 6.7M rows, and was then log-transformed (with the exception of the pH columns, in which were first transformed as $10^{-pH}$ before log transformation), mean centered, and normalized by the standard deviation of each column.

As mentioned previously, product quantization is a computationally efficient method for approximate nearest neighbor search at scale up to billions of data items. By reducing data to fewer columns and assigning each data row to a set of subspace labels, PQ achieves simultaneous dimension reduction and classification. In the Python programming language, two available packages for the implementation of PQ are Facebook AI Similarity Search (FAISS) and NanoPQ. Embodiments may use various packages to implement PQ. NanoPQ may be utilized on a variety of platforms. For reproducibility, Python 3.7 was used along with NanoPQ version 0.1.8.

When using product quantization in Python, the two most influential parameters to be set are code size and number of subspaces. In the dataset, the n-dimensional vector space is divided into equal smaller spaces called subspaces, meaning the dimensions are equally divided into smaller sizes. Then quantizing each subspace using the K-means clustering algorithm provides each subspace and each unique combination of subspace labels has its own centroid. The set of subspace labels represents the original data row and can be inverted to return the associated centroid. The sum of the Euclidean distances between data rows' PQ-determined centroid and the original data is the 'Round Trip' error.

Subspace size and code size control the trade-off between the model accuracy and application performance. A larger subspace size and/or larger code size means higher round trip accuracy (i.e., lower reconstruction error), but may 'overspecify' each data item so that analog search returns very few or no solutions. Smaller subspace size and/or lower code size, increases the number of analog search results but may result in 'underspecification' where large numbers of inappropriate similarity results are returned. Choosing the right subspace and code size produces a balanced model which returns the correct number of results for target regions selected by the SME. The round-trip performance of PQ varies with differing subspaces; a subspace of size four produces lower round trip performance RMSE.

Choosing the appropriate clustering, or code, size balances the specificity of having more and smaller clusters with the usability of having fewer, but larger, clusters. To determine the best clustering size, the roundtrip error is analyzed relative to the number of labels. To determine the optimal number of subspaces and clusters to use, a combinatorial search through using these parameters can be completed to determine the Pareto frontier of this objective.

The Pareto Frontier, also called the Pareto Front or Pareto Set, is a set that captures the tradeoffs between optimal solutions for a problem. Using classification engineering principles, optimal solutions are identified in a systematic way that are data-driven and free from influence of the historical understandings of geological features. A visualized pareto front pairs soil science knowledge of expected clusters with data-driven knowledge that allows an unbiased view of the available solutions and boundaries, which can be applied to a range of potential problems with specific accuracy, visualization, and resource needs.

For any application, the set of possible solutions can be narrowed using the pareto front to bracket the best available systems, with the most efficient combination of code size and subspace graphed farthest to the left on a plot of centroids vs. RMSE. As a part of the classification engineering process, graphing the pareto front allows for collaboration between the Machine Learning team and soil science field experts to determine the best code size. Using the predictions of soil science experts who approximate 50,000 unique categories of soil, the best combination of the two can be identified. A combination of a seven-bit code size with three subspaces returns 60,000 centroids and an RMSE of approximately 0.034.

Examples described herein may include various components and features. Some of the components and features may be removed and/or modified without departing from a scope of the method, system, and non-transitory computer readable medium for providing regional LSH searches. It is also appreciated that numerous specific details are set forth to provide a thorough understanding of the examples. However, it is appreciated that the examples may be practiced without limitation to these specific details. In other instances, well known methods and structures may not be described in detail to avoid unnecessarily obscuring the description of the examples. Also, the examples may be used in combination with each other. As used herein, a component is a combination of hardware and software executing on that hardware to provide a given functionality.

FIG. 1 is a flow chart based on comparing regions according to an example. In block 110, a search point contained in geo-located data is identified, the search point being nearest in distance to a query location. For example, a user can click on a point in a map as the query location, and the program will select the search point from the data that is nearest to that point. In block 120, a search region associated with the search point is determined, the search region comprising a plurality of neighbor points contained in the geo-located data that are nearest k points by distance to the search point. For example, a k-nn library may be used to provide the k-nearest neighbor search functionality among the data points. In block 130, a plurality of centroids is determined, corresponding respectively to the plurality of neighbor points of the search region. For example, a PQ model is used to return the centroids. In block 140, the plurality of centroids of the search region are compared to other centroids corresponding to other regions of the geo-located data. For example, LSH is used to obtain results, to compare the centroids. In block 150, a plurality of counts is generated for the number of other centroids that match with the plurality of query centroids. For example, the centroid comparisons are tallied as to whether the centroids match, and those tallies serve as the scoring. In block 160, the plurality of counts is ordered in descending order, corresponding to listing the other regions having the highest similarity first. In block 170, an ordered list of the other regions is generated based on their respective similarities to the query region. This places the most relevant, highest matching data at the top of the ordered list.

Product quantization allows users to determine the number of clusters used to classify the data by setting a code size. This code size represents the number of bits that are allotted for unique classification designations. For a code size of four, we allow 16 codes, or clusters. Each data point is assigned a code; each cluster is assigned a centroid, and every point is associated with a centroid (the nearest neighbors). Additionally, the dataset can be further broken down by subspace, that is, broken down into smaller datasets and processed individually to lower memory cost.

Two parameters to compare are code size and number of subspaces. The code (or bit) size primarily balances the specificity of having more and smaller clusters with the usability of having fewer, but larger, clusters. Subspace size primarily balances the trade-off between the model accuracy and memory-cost. As mentioned earlier, the larger subspace size contributes to higher accuracy but higher memory-cost. The smaller subspace size contributes to lower memory-cost but with lower accuracy. Choosing the right subspace size will produce a balanced model that is both accurate and memory efficient. Although a larger subspace size produces lower round trip performance RMSE compared to the lower subspaces, as the code size increases, the computational expense of the quantization increases significantly. For some embodiments described herein, the increase in the computational expense of the quantization was an acceptable tradeoff for the accuracy achieved by using the larger subspace size.

Embodiments use the query to identify what properties to search for, e.g., which soil properties to search for around the world that would be similar to the query selection. The properties from the query are split into subspaces, the subspaces are compressed, and the compressed subspaces are compared with other properties from the available data set. In the soil example, embodiments will show other points in the dataset that are closely related to the query region properties. The output (shown in the flowchart 600 of FIG. 6 as ordered regional LSH result of block 660) is a scoring. The scoring shows how closely matched the properties of a given data point are to the properties represented by the query region. For example, a region with five neighbors and six subspaces establishes a maximum similarity score of 30. Embodiments can score individual data points, and also can map the result scores using colors or highlights to indicate the similarity score across the various geographies represented in the dataset.

Figure 2:
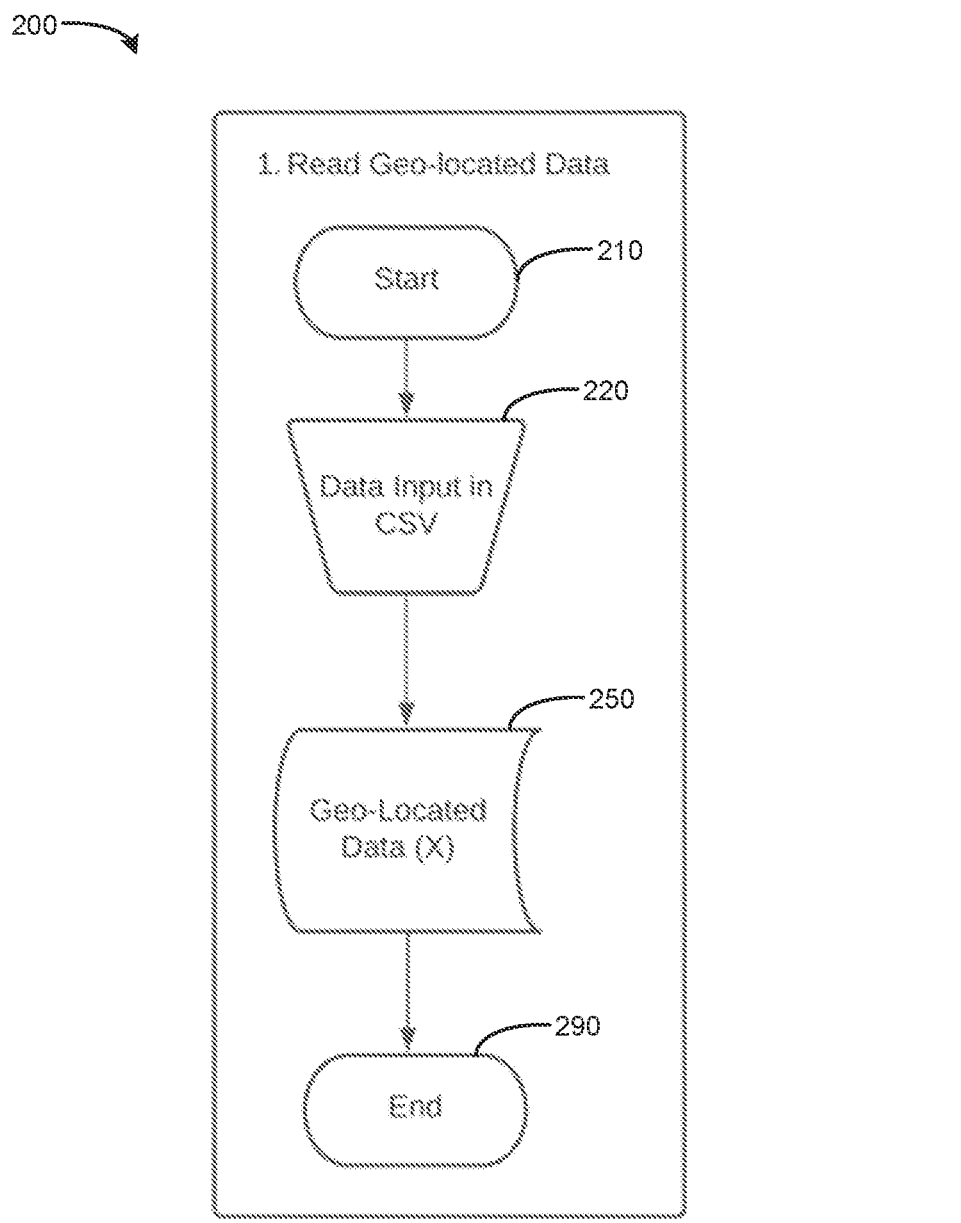
FIG. 2 is a flow chart based on reading geo-located data according to an example.

FIG. 2 is a flow chart 200 based on reading and creating geo-located data according to an example. Generally, the Input file is expected to contain Geo-Located Data with the latitude and longitude information. The input data is converted into a tabular format and the Geo-located tabular data (X) is persisted for later use. In an example, a python library called Pandas is used, and its read_csv function is used to read the CSV data into the tabular format in memory.

The process illustrated in flow chart 200 is called by the processes in subsequently described flow chart 300, flow chart 400, and flow chart 500. The process of flow chart 200 creates the geo-located data and writes the geo-located data x. Such data is used as inputs in subsequent flow charts.

Describing flow chart 200 more specifically, flow starts at block 210. In block 220, data is input in comma separated values (CSV). For example, a CSV input data file that contains Geo-Located Data latitude and longitude information is read in. In block 250, geo-located data (X) are produced. For example, The CSV input data file is converted into a tabular format. The geo-located tabular data (X) is persisted for later use. Flow ends at block 290.

Figure 3:
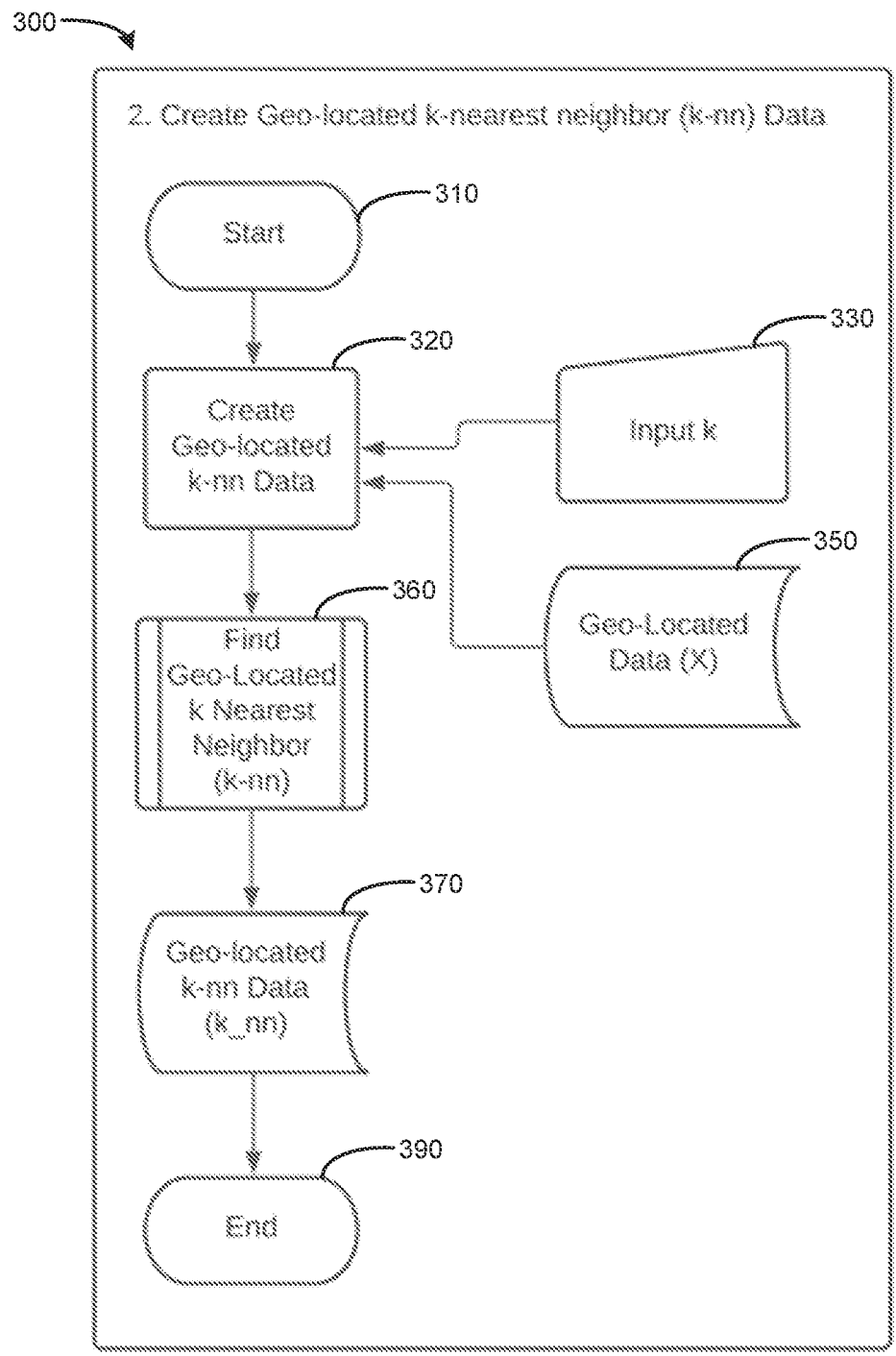
FIG. 3 is a flow chart based on creating geo-located k-nearest neighbor (k-nn) data according to an example.

FIG. 3 is a flow chart 300 based on creating geo-located k-nearest neighbor (k-nn) data according to an example. Assuming a geo-located index in the geo-located data points, the index is used to uniquely identify the data points and the index is persisted among different tables and results. The region is formed by the k-nearest neighbors to the query point. The region is identified using the same index. The LSH query result, referenced below, returns a list of indexes and centroids for each index. A result index is used to identify the original data point in the dataset.

Generally, the concept of region is important to the Regional LSH Search process. A region is considered to be the data points that are geographically closest to the search point. K is the number of nearest neighbors to include within a region. In other words, k is the region size. Some example values for k are 5, 50, 100 and so on. Embodiments can preprocess the k nearest neighbor for every data point in the dataset, which saves time and makes the Regional LSH Search process efficient. The k-nn algorithm that is used in this process comes from a well-known python package called scikit-learn, which the process can access via a library call.

An appropriate region size can be determined by a Subject Matter Expert (SME). The SME can select the region size based on knowledge about whether there is a particular area of interest, e.g., a size of a construction site. The embodiments described herein enable control over what size region to use for the search, and what size regions to search among. The region may be arbitrarily chosen to be any size, providing flexibility to accommodate any situation. In general, the region size may be chosen in view of a given application to best represent a region of interest in terms of that application. For example, a region size for soil analysis would take into consideration soil applications such as construction site size and variation of soils at the proposed construction site. The k value is also determined based on the method of the region of interest selection. An example method of selection is via a user interface, to select or identify (e.g., by clicking) a location in the map or by selecting latitude and longitude. In that example, the SME would determine if the region of interest would be served by one of the existing preprocessed k values (5, 10, 100, . . . ), which have been used to pre-process the data set.

More specifically, embodiments include pre-calculated or preprocessed region sizes for the data. Such region sizes may be suitable for most arbitrarily selected region sizes that are specified for conducting searches. For example, the nearest neighbors of each data point can be precalculated for region size 5, 10, 100, and so on to save time. Finding each datapoint's k nearest geographical neighbors takes processing time. Preprocessing them saves significant time later during the search. When a user selects a region size from one of the pre-calculated region sizes, the embodiments can use the pre-calculated k-nn dataset to determine its nearest neighbors. Another example method of selection is via a user interface to allow an area to be selected in the map, or selecting latitude and longitude and specifying a radius for the area. Once the area is selected, the number of points within that area are counted. To illustrate, if the area selected in the map contains 80 number of points then the region size is 80, since these 80 datapoints are located near each other geographically there is no need to figure its nearest neighbors using the pre-processed k-nn.

Another example method of selection is via a user interface to allow an area to be selected in the map, or selecting latitude and longitude and specifying a radius for the area. Once the area is selected, the number of points within that area are counted along with the pre-calculated k-nn to widen the user selected area. The user selects the preprocessed k values (5, 10, 100, . . . ). To illustrate, if the number of points is 80 within the selected area, then if the user selects a preprocessed k value of 5 then the region size will consist of 80 datapoints and its 5 nearest neighbors, some of it may already be part of the original user selected area.

The process illustrated in flow chart 300 makes use of the process shown in flow chart 200. Subsequently described flow chart 600 makes use of the process illustrated in flow chart 300 (e.g., using the geo-located data (x) generated by flow chart 200). The process of flow chart 300 produces k-nn data, used by the process in flow chart 600.

Describing flow chart 300 more specifically, flow starts at block 310. In block 320, the geo-located k-nn data is created, e.g., based on inputs. In block 330, k is input. For example, an appropriate k value is chosen as an input for the k nearest neighbor calculation. In block 350, geo-located data (x) is input. For example, the previously saved Geo-located Data (X) is selected as an input for the k nearest neighbor calculation. In block 360, geo-located k nearest neighbors (k-nn) are found. For example, Geo-Located k Nearest Neighbor (k-nn) are found using a knn algorithm from a library. The input k and Geo-located Data (X) serve as parameters for input. In block 370, geo-located k-nn data are produced. For example, the result is saved in memory k_nn, and the results are persisted as k-nn Data for later use. Flow ends at block 390.

Figure 4:
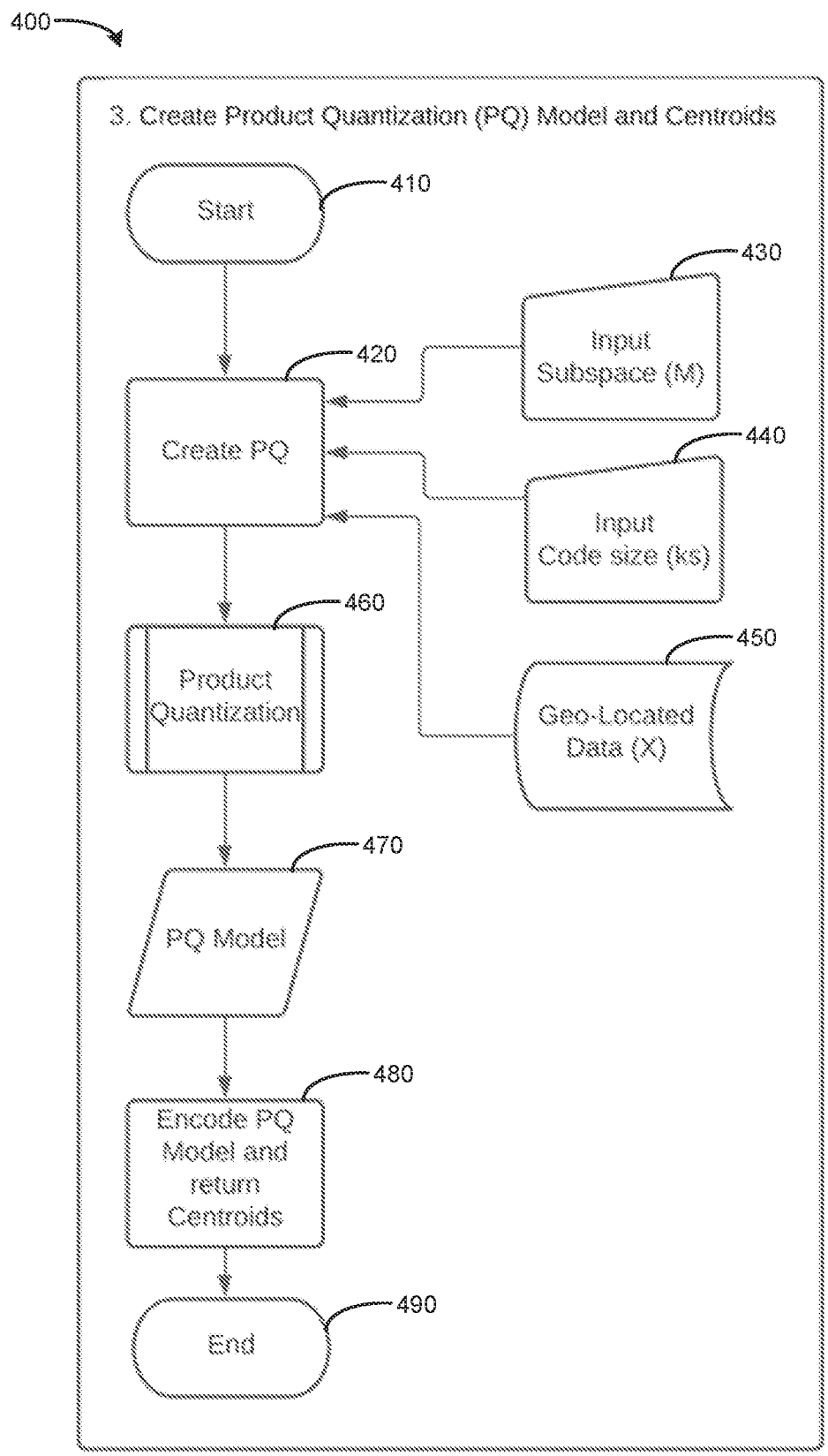
FIG. 4 is a flow chart based on creating a product quantization (PQ) model and centroids according to an example.

FIG. 4 is a flow chart 400 based on creating a product quantization (PQ) model and centroids according to an example. Generally, Product Quantization (PQ) allows for memory efficient similarity search, possible for large scale high dimensional data. PQ is a process in which high dimensional (features or columns) data is sub divided in equal numbers of sub-spaces (M). A sub-space is processed using k-means clustering technique to produce clusters, and a cluster is represented by its centroid. The number of clusters or centroids depends on the code-size (Ks), which is an exponent value of two. Data points are subdivided based on equal number of columns, thus forming subspaces. Dividing data points keeps the fields of a given data point intact. The dataset can be split across multiple subspaces, as part of the Product Quantization process. A dataset contains columns of distinct features and rows of specific data samples. A space is represented by all the columns, so a subspace is an equally divided part of the space, i.e., the dataset equally divided by columns. If the number of columns cannot be equally divided, then a dummy place holder column (column of zeros) is added to make the number of columns equally divisible. To illustrate, if a dataset contains 48 columns of data, the columns can be divided equally into 2, 3, 4, 6, 8, 12, and 48 subspaces. The choice of number of subspaces controls the tradeoff between accuracy and memory-cost.

Centroids are part of product quantization (PQ). The results from the PQ model are the centroid codes. The results can be managed as an array containing the centroids for every data point. In embodiments using a point-based selection, the collective representation of a region is from the k-nn preprocessed lookup table. In embodiments using a region-based selection, the query area and the points falling within that area are selected and each of the point's k-nn is compiled together as one list. The collective is ordered by the index.

Embodiments can interact with data that has many columns, such as 1-dimensional data having many dimensions or features. Such data can be of a nature that it becomes impractically time consuming to compare every dimension. Accordingly, the program uses the concept of subspaces. For a given number of columns i, the program breaks the data into sub-columns. For example, for 48 columns, the program can break the 48 columns into n=six sub-columns or sub-spaces. Within each subspace, the program uses the concept of code size ks (corresponding to a function of the number of centroids) to represent the data. The code size ks is expressed as a power of two. Thus, for a code size ks of eight, the number of centroids can be calculated as $2^8=256$. This corresponds to taking one subspace and dividing its data into 256 groups of data. Put another way, in vector space, within each subspace, there will be a number of columns. The program subdivides each subspace into, e.g., 256 groups of data. In vector space, the program places the data in different areas, and determines 256 centroids for the data. In this example based on 256, the entire subspace is represented by values between 0 to 255, using the centroids and not the actual data. Thus, if the actual data point is, e.g., 0.6 or 0.7, the program can use a centroid of value 5 or 6, for example, to represent the data. This type of product quantization compresses the data down to smaller subspaces. This enables the program to search among and compare between the centroids to find centroids similar to the search centroid, which is far more efficient than searching through all of the actual data.

Thus, the dataset without the geo-location information is processed through PQ, and the dataset is compressed and represented by product quantized centroid codes. The compression is a lossy compression and the dataset can be recreated very close to the original dataset by decoding the centroid codes using the PQ Model.

With the help of Subject Matter Experts (SMEs), the appropriate code size can be determined. For example, SMEs identify the number of expected centroids or different types of classification expected within the subject. For example, the SMEs can identify or approximate the number of unique classifications of data (soil types). If the SMEs identify that there are approximately 65,536 different types of soil taxonomy, then the code size can be determined by taking $\log_2(65,536)=16$, thus determining ks to be 16. The SMEs can optimize the code size and inputs based on the number of centroids representing a realistic number of soil types globally. The number of soil types globally indicates to the SMEs what number of centroids would be appropriate. Continuing the previous example, assuming there are approximately 65,536 different soil types, then there will be 65,536 centroids within each subspace. Each centroid will range from 0 to 65,535, and each centroid will be represented in binary format 0 to $(2^{16})-1$.

Different subject matters (e.g., in applications other than soil comparisons) also can inform the corresponding SMEs as to what number of centroids would be appropriate to cover the different types of data for that subject matter. The desired number of centroids can be used to set other inputs. For example, taking a log base two of the centroids will result in the code size that is appropriate for the model. Thus, $\log_2(\text{centroids})=\text{code size}$. In an example, SMEs run a research mode, called a grid search, to find which code size, subspace or other inputs enable the embodiments to perform well. The SMEs run a pareto front to illustrate what size inputs to use. The number of sub-spaces chosen also can be affected by the tradeoff between compression reconstruction accuracy and memory-cost. In an example, the PQ function that is used in this process comes from a python package called NanoPQ.

The process illustrated in flow chart 400 makes use of the process shown in flow chart 200. Subsequently described flow chart 500 and flow chart 600 make use of the process illustrated in flow chart 400. The process of flow chart 400 creates two objects, the PQ model and the centroids. The PQ model is used in the process of flow chart 500. The centroids are used in the process of flowchart 600.

Describing flow chart 400 more specifically, flow begins at block 410. In block 420, PQ is created. For example, the PQ is initialized based on various inputs. In block 430, subspace (M) is input. For example, an appropriate Subspace (M) is chosen. In block 440, code size (ks) is input. For example, an appropriate Code-size (Ks) is chosen. In block 450, geo-located data (x) is input. For example, the previously saved Geo-located Data (X) is selected as an input. In block 460, product quantization is performed. For example, the various indicated inputs are passed as parameters to the Product Quantization (PQ) function to create the PQ Model. In block 470, the PQ model is created. For example, the returned PQ model is saved in memory. In block 480, the PQ model is encoded and centroids are returned. For example, the returned Centroids from the PQ Model encoding are saved in memory. The results are persisted as Centroids and PQ Model for later use. Flow ends at block 490.

Figure 5:
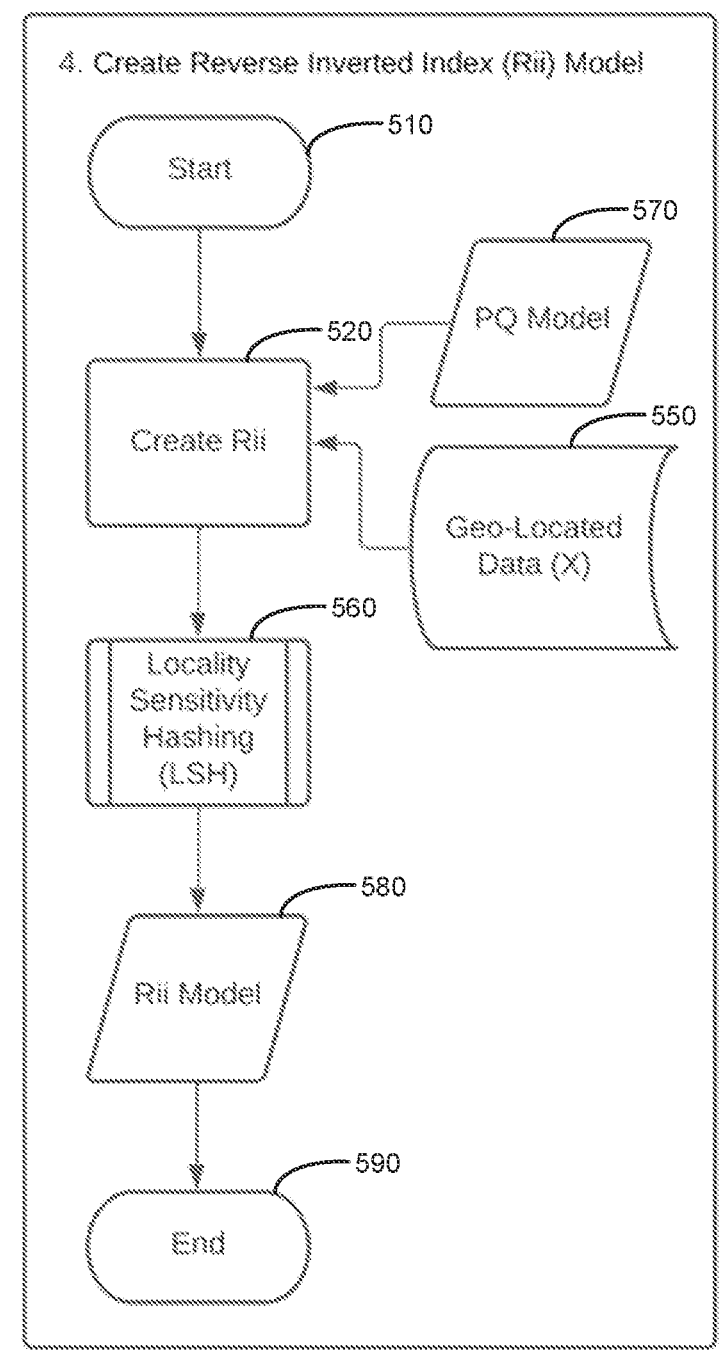
FIG. 5 is a flow chart based on creating a Reconfigurable Inverted Index (Rii) model according to an example.

FIG. 5 is a flow chart 500 based on creating a Reconfigurable Inverted Index (Rii) model according to an example. Generally, the Reconfigurable or Reverse Inverted Index process helps with similarity search. The centroid codes from the PQ Model represent the cluster of similar data points for each sub-space. To find data points similar to the point of interest, first the centroid code for the point of interest is calculated. Then, getting all the data points within that centroid code's cluster gives all the similar points. The distance between the similar points and the cluster centroid shows how similar the data is to the query point of interest. Using Locality-Sensitivity Hashing (LSH), the centroid and its cluster members are hashed for easy storage and retrieval. By using LSH, the search process is near instant. In an example, the LSH query function that is used in this process comes from a well-known python package called Rii (Reconfigurable Inverted Index). LSH is used to search for nearest data in the sense of similarity of data, in contrast to k-nn which searches for nearest points geographically. Straightforward comparisons between data can be practical for much smaller datasets or numbers of subspaces. However, for larger datasets and larger subspaces, the data comparisons become brute-force and the time efficiency is $\log(n^2)$, exponential without mechanisms like LSH that improve efficiency.

The Rii Model takes the PQ Model's resulting centroids and, using its LSH functionality, hashes (stores) the centroids efficiently for querying that is faster than comparing against the entire dataset (e.g., a dataset of 6.7 million for soil taxonomy). The query data point's centroid is run through the same LSH hashing function. Instead of storing the centroid, it will in turn return all the indexes that are hashed to the same bucket. The indexes from the same bucket represent similar data points as to the query. Rii has implemented this reverse lookup process to make it easier to find similar data points. The LSH function is provided via the Rii along with the reverse look up.

The process illustrated in flow chart 500 makes use of the process shown in flow chart 200. Subsequently described flow chart 600 makes use of the process illustrated in flow chart 500. The process in flow chart 500 creates the Rii model, which is used in the process of flow chart 600.

Describing flow chart 500 more specifically, flow begins at block 510. In block 520, Rii is created. For example, various inputs are passed into a function to create the Rii. In block 570, PQ model is input. For example, the previously saved PQ model is selected as an input. In block 550, geo-located data (x) is input. For example, the previously saved Geo-located Data (X) is selected as an input. In block

560, locality sensitivity hashing (LSH) is created. For example, using the Reverse Inverted Index (Rii) function, create the Rii Model. Pass in the centroid codes and the PQ Model as parameters to create Reverse Inverted Index. Then use the Rii for LSH search at block 560. In block 580, the Rii model is saved. For example, save the returned Rii Model in memory and persist the result as a Rii Model for later use. Flow ends at block 590.

Figure 6:
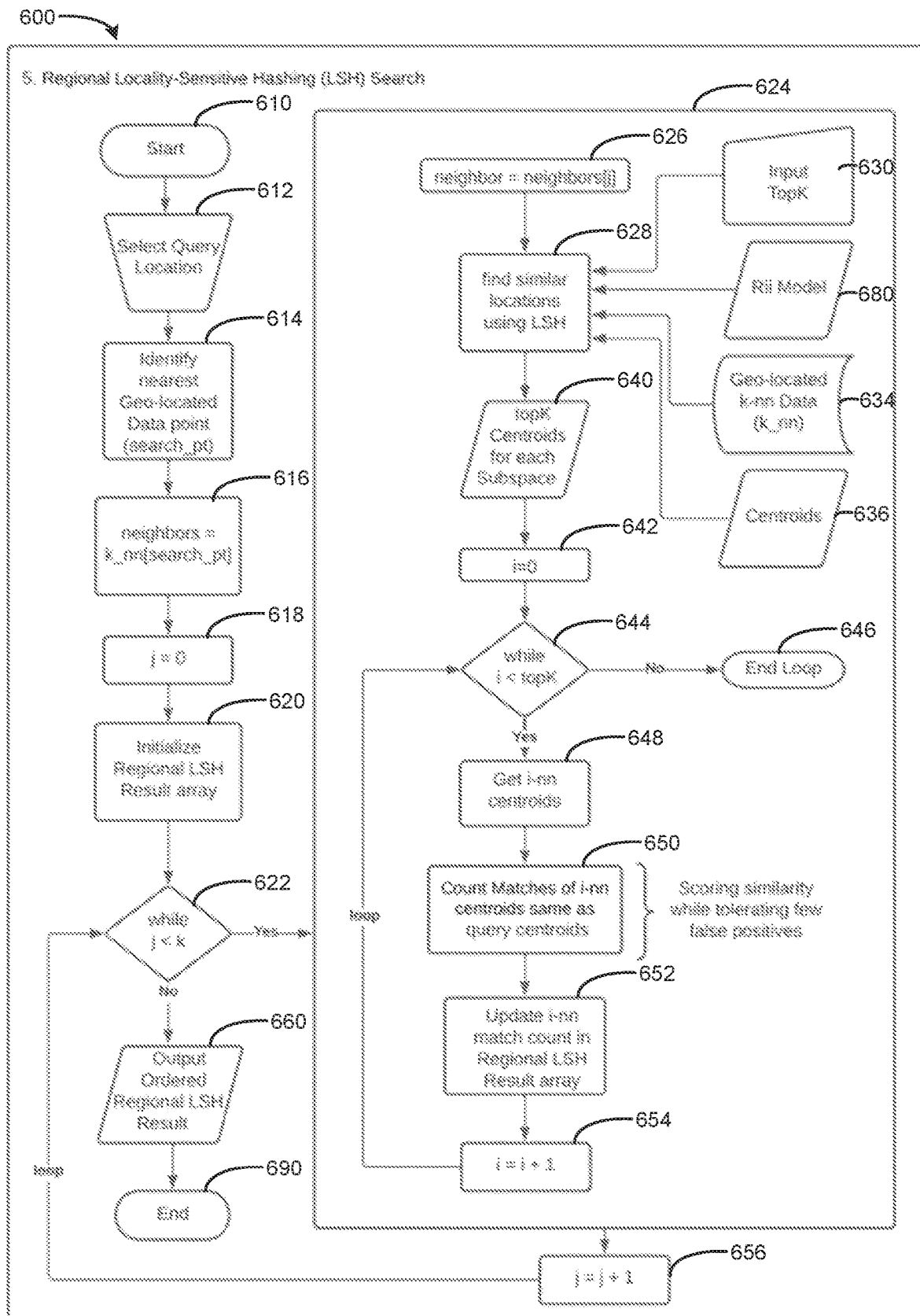
FIG. 6 is a flow chart based on performing a regional locality-sensitive hashing (LSH) search according to an example.

FIG. 6 is a flow chart 600 based on performing a regional locality-sensitive hashing (LSH) search according to an example. Generally, in some domains, a specific data point isn't relevant. However, when combined with data points that are closely geo-located to the specific data point, then it becomes relevant. The number of data points (k) in a region depends on the domain application. A region represents many data points and ranges of values instead of just the query data point. Each data point is represented by its centroid code and each region is represented by the collective centroid codes.

To search for similar regions around the world, first, a query point is identified either interactively from a map or from the dataset. In an embodiment, a user manually specifies the query point via a user interface. The user may choose a point on a map, may draw a circle on the map to capture multiple points, or the like. Although there may be data corresponding to the query point, data may not be available. For example, soil samples are available throughout the world, but not every point of the world has been sampled, leaving points with no data. In an embodiment, the program identifies a nearest search point from the data, which is similar to the query point.

Then, the query point's region is identified from the previously processed k-nearest dataset. If the point itself is not represented fully, the program considers other points around the query point. The program considers to be a region any number of nearest points around the sample data. The user may choose the number of data points to represent a region, designated by the variable (k) in the flow chart. Lower values of k correspond to more specific regions. Higher values of k correspond to wider regions. The region around the query point is referred to as the query region, which contains query region data points. The program will search for other regions around the world that are similar to the query region. This provides enhanced searching. The region-based concept of searching goes beyond a similarity search for a single point.

The query region's data points are next run through LSH, to prepare the data for pattern matching. In an embodiment, the program calculates for every geo-located data point a nearest a point in interest, and what are its properties. The program loops through the region's neighbors to find similar data points.

The centroids of each of the similar data points are then compared against the query centroid, and the number of matches is counted and scored. For example, the program can compare six query centroids (corresponding to six subspaces) against the LSH centroids, performing a one-to-one comparison. If the centroids match, their score is incremented. The degree of matching, in a soil context, indicates that the soils in the matching subspace are equivalent. If more soil subspaces match, that indicates that the query is very similar. The program iterates through the rest of the data in this manner. The program can efficiently address and compare the data because each subspace is compressed to represent the entire data. This makes it easier to compare, in a reduced dimension.

As set forth above with reference to flow chart 400 of FIG. 4, centroids are obtained as part of product quantization (PQ), allowing for the program to operate efficiently. Even if not an exact match, there will be some of the centroids that will match, and the program ranks the matches. Those with higher numbers that match are closer, i.e., the scores with higher counts are considered to be very similar to the query. This approach as described above is a point-to-region search. A similar approach is used for region-to-region search, where instead of one initial query point, there is a selection of initial data points made, and that is considered to be the query region, and the rest of the scoring process is similarly performed. Thus, the program develops a pattern for each point and for its neighbor around it, and the program uses that pattern to search. The pattern-based searching goes beyond a search based on one point. In an embodiment, the program searches for similar patterns of the query soil type and surrounding soil types. The program sets up the pattern matching, makes a classification scheme for these patterns, and searches for the pattern.

More specifically, flow begins at block 610. In block 612, a query location is selected. For example, a user interface allows for the selection of a Query Location from a map, by clicking on the map. In block 614, a nearest geo-located data point is identified. For example, the Geo-located Data search point (search_pt) is identified from among the geo-located data, that search point being nearest in distance to the selected query location. In block 616, neighbors are set to k nn[search pt]. For example, the neighbors nearest the search point are found, thereby establishing the region containing the k nearest neighbors of the search point found from the previously calculated k_nn data. In block 618, j is initialized to zero. For example, j serves as a placeholder representing a given neighbor to be compared, while cycling through the k nearest neighbors. In block 620, the regional LSH result array is initialized. For example, a Regional LSH Result array is initialized of size n rows, same as the Geo-located Data, to hold the similarity scoring. The regional LSH result array is like counter for the data, e.g., 6.7 million data in an example application. The LSH result array can be used to count similar results, such as those matching to within a given percentage threshold, which is adjustable. In another embodiment, the LSH result array can be used to sort the results and the program can accept a number of the top or best matching results, where the number is adjustable. The number of rows represent the number of data sample points collected with the geographical information (latitude and longitude). The number of rows in the geo-located data is the same as the number of rows of data points. In order to score the LSH results, the program initializes an empty array with the same size as the number of rows. The same size is used because it is not known in advance which rows are going to be similar to our query region. As the LSH result for each neighbor of the query point is processed, the value of one is added to the data point (row), thereby incrementing their similarity score.

In an example embodiment, the Regional LSH result array has the same number of rows as the data points in the geo-located data, but with only one column of data, which is the similarity count. For example, the first five rows of the Regional LSH result array would contain an index column, to indicate which data point, and a count column, to indicate the count corresponding to that data point's similarity with the query. The higher the count, the higher the similarity. A count of zero indicates no similarity.

In block 622, a while loop is entered while j is less than k. For example, if j is less than k, the loop 624 is performed.

Thus, for each neighbor (jth index) in the region containing k nearest neighbors, the loop 624 is performed until all neighbors have been processed.

Loop 624 begins with block 626. In block 626, the neighbor is set to neighbors[j], e.g., the jth neighbor for further processing in that given iteration. In block 628, similar locations are found using LSH. For example, LSH uses various inputs to find similar locations to the jth neighbor.

In block 630, TopK is input. TopK can be chosen as a value (e.g., 20,000) to return that number of top k nearest PQ codes (array of centroids) of approximate matches. In flowchart 600, choosing a TopK of 20,000 results in looping through the subloop for i=0 to 20,000-1 times, to count the scoring aspect for the given neighbor at the jth index for the main loop. For example, appropriate top neighbors are chosen to return from the LSH query as topK.

Topk can be determined based on trial and error. Topk indicates how many LSH search results to return. Topk is determined by initially setting a higher topk, and then plotting the results to understand where is the cut-off. The cut-off is located between items that are very similar vs those that are less similar. The cut-off is determined with the help of a SME (by looking at a diagnostic chart or graph), balancing a need for high similarity vs low similarity needs. Each datapoint has its own set of centroids according to its subspaces. The separation formed by the cut-off depends on how many of the query centroids match with LSH query results and its centroids. The topk allows the LSH query to return only the top most similar centroids. The custom scoring with threshold allows to even further the filtering of similar soil taxonomy. The LSH topk results are the top k nearest neighbors in the PQ vector space that have been stored using LSH for fast retrieval. In an example, topK is chosen close to 20000, and is much larger than k, because the program is trying to find similarity of data points other than k (5, 10, 100, . . . ). The program chooses the top neighbors topk from each of the candidate regions from the data set that the LSH query identifies are most similar.

The choice of topk is also influenced by how LSH itself is a heuristic, balancing between ideal desired results and what results are actually practical. For a given region of interest being compared, it is desirable for embodiments to produce a list of similar regions or data points ordered from most similar to least similar. The diagnostic chart reference above (which a SME can use for choosing topK) shows that LSH produces a ranked list that is approximate. The chart produces data exhibiting a step function, with most similar results on the left along with their numbers. This is because LSH approximates, or can include deviations when moving from the more similar to less similar results. But when choosing topk, it is desirable to use a topk value that achieves a level of assurance that the desirable results are found, that the true positives are identified, while tolerating some other results. In other words, choose a topk that errs on the side of caution, to avoid missing one of the desirable results even if it means receiving some noise. The nature of comparisons and finding similarities in large data is that combinatorics can lead to intractable situations. Accordingly, topK is used to set an acceptable level of error, where some other results are included along with the definitely desirable results. The SME examines this question, and makes informed choices as to level of accuracy. A narrower numerical threshold for the topk is chosen if the level of error is too high. A broader threshold is used to find all the very best answers while including some noise, e.g., when examining the results manually to filter out the noise. An example approach for LSH is to examine the diagnostic chart step function, and if not well-behaved for the desired application, choose a more reasonable cutoff value and iterate. Such an iterative approach can help find a good trade-off between a desired level of similarity and an acceptable level of false-positives. Choosing a high cutoff threshold causes LSH to have higher accuracy with fewer inaccuracies. A lower threshold makes it harder for LSH to distinguish. The threshold affects the desired accuracy, whether the current PQ accuracy classification system has a desirable tradeoff for the diagnostic chart step function. In an example, the desired level of accuracy is tested by examining results for a known test case (such as a known, well-established site where the relationship between soil analogues is known). If the program is not producing acceptable results for the test case, then the LSH is recalibrated, or the PQ is redone. Changing the code size and number of subspaces influences the LSH and PQ, e.g., increasing matching difficult as the number of subspaces increases, achieving higher accuracy at the cost of fewer results (e.g., a tradeoff between performance of the PQ and LSH).

In block 680, the Rii model is input. For example, the previously saved Rii Model (block 580) is selected as an input to perform the LSH query. In block 634, geo-located k-nn data is input. For example, the previously saved Geo-located k-nn Data (k_nn) is selected as an input. In block 636, centroids are input. For example, the centroids returned in block 480 of FIG. 4 are used as input. In block 640, the TopK centroids are selected for each subspace. For example, it is determined what number of TopK centroids to use.

Next, the flow loops through each result index from the LSH function, to count the matches with the k-nn centroids. In block 642, i is used to represent the current result index and it is initialized to zero. For example, i is incremented with each pass through the subloop within the main loop 624, keeping track of which of the centroids match against query centroids. In block 644, a while loop is entered if i is less than TopK. For example, flow loops through the results from the LSH function, which will be the length of topK, via the subloop. Flow enters the subloop only if the current item i is less than topK. If i is not less than TopK, the loop exits at block 646. If i is less than TopK, flow proceeds to block 648. In block 648, i-nn centroids are obtained. For example, the subloop gets the ith nearest neighbor (i-nn)'s centroids from the Centroids dataset. In block 650, the matches of i-nn centroids being the same as the query centroids are counted. For example, the subloop counts how many i-nn centroids are the same as the query centroids. I-nn centroids are compared element by element against the query centroids to see which ones match, meanwhile keeping a score for the current I'th result. This scores the similarity while tolerating some false positives. In an example, the overall scoring for a specific datapoint is based on the number of neighbors and subspaces. For five neighbors and six subspaces, their product of 30 establishes the top score that is possible to find in the loop, when determining the similarity score.

In an embodiment, a python library is used to count matches of the i-nn centroids, by performing a vectorized loop in parallel to provide fast performance. Accordingly, although loops are performed, the vectorization may be provided at a hardware level, providing quick and efficient performance. In an embodiment, vectorized calculations are supported by the MKL library, which makes available low-level vectorization of array operations, e.g., to perform operations without specifically needing to loop through the operations.

In block 652, the i-nn match count in the regional LSH result array is updated. For example, the subloop updates the i-nn match count in the Regional LSH Result. In block 654, i is incremented by 1. Flow loops back to block 644 (the beginning of the do-while subloop), for testing whether i has incremented enough to end the loop at block 646. If i has incremented to the value of TopK, the subloop exits per block 646 and flow proceeds to block 656. In block 656, j is incremented by 1. Flow loops back to block 622 per the main loop, to test whether j has incremented enough to end the loop 624. In block 622, if j has incremented to the value k, flow proceeds to block 660. For example, when the k nearest neighbors of the region have been compared. In block 660, the ordered regional LSH result is output. For example, the Output Regional LSH Result array is ordered in descending order to capture the regions with high similarity first. The Output Regional LSH Result is returned. Flow ends at block 690.

Figure 7:
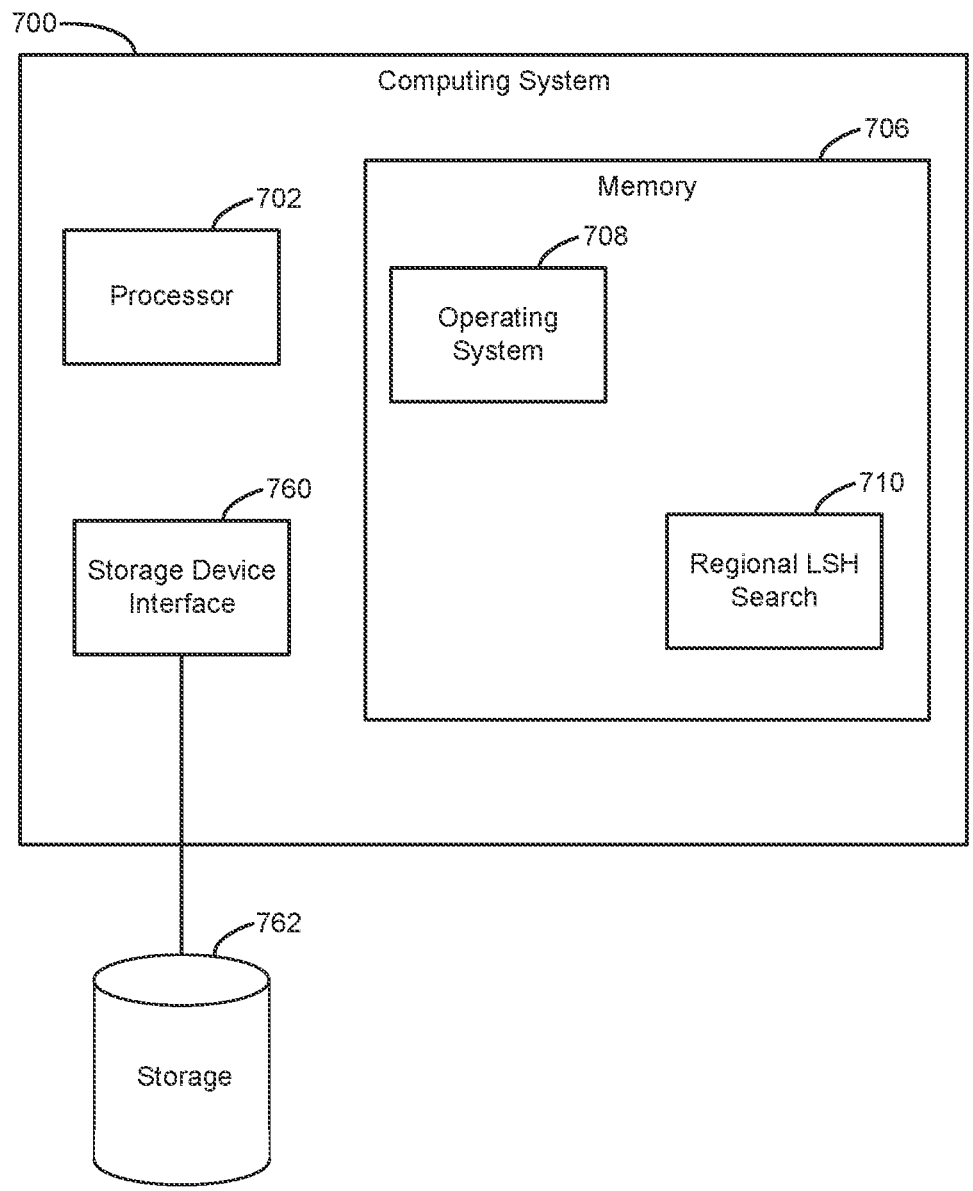
FIG. 7 is a block diagram of a computing system including a regional LSH search according to an example.

FIG. 7 is a block diagram of a computing system 700 including regional LSH search 710 according to an example. The computing system 700 also may include a processor 702, memory 706, and storage device interface 760. The memory 706 of computing system 700 may be associated with operating system 708. The storage device interface 760 is to interface with stable storage 762, such as one or more non-volatile volumes.

In an example, the regional LSH search 710 is performed from the memory 706 according to flowchart 600 of FIG. 6.

Processor 702 may be any combination of hardware and software that executes or interprets instructions, data transactions, codes, or signals. For example, processor 702 can be a microprocessor, an Application-Specific Integrated Circuit (ASIC), a distributed processor such as a cluster or network of processors or computing device, or a virtual machine.

Storage device interface 760 is a module in communication with processor 702. Computing device 700 may communicate via the storage device interface 760 (e.g., to exchange symbols or signals representing data or information) with at least one stable storage 762. Stable storage 762 is to store a number of data resources that may be organized in databases, key-value stores, data stores, and so on. Storage device interface 760 may include hardware (e.g., pins, connectors, or integrated circuits) and software (e.g., drivers or communications stacks). For example, storage device interface 760 can be a Parallel AT Attachment (PATA) interface, a Serial AT Attachment (SATA) interface, a Small Computer Systems Interface (SCSI) interface, a network (e.g., Ethernet, Fiber Channel, InfiniBand, Internet Small Computer Systems Interface (iSCSI), Storage Area Network (SAN), or Network File System (NFS)) interface, a Universal Serial Bus (USB) interface, or another storage device interface. Storage device interface 760 can also include other forms of memory, including non-volatile random-access-memory (NVRAM), battery-backed random-access memory (RAM), phase change memory, and so on.

Memory 706 is a processor-readable medium that stores instructions, codes, data, or other information. For example, memory 706 can be a volatile random-access memory (RAM), a persistent or non-transitory data store such as a hard disk drive or a solid-state drive, or a combination thereof or other memories. Furthermore, memory 706 can be integrated with processor 702, separate from processor 702, or external to computing device 700.

Operating system 708 and regional LSH search 710 may be instructions or code that, when executed at processor 702, cause processor 702 to perform operations that implement operating system 708 and regional LSH search 710. In other words, operating system 708 and regional LSH search 710 may be hosted at computing device 700. More specifically, regional LSH search 710 may include code or instructions that implement the features discussed above with reference to FIGS. 1-6, for example.

In some implementations, regional LSH search 710 (and/or other components, such as the various processes disclosed throughout) may be hosted or implemented at a computing device appliance (or appliance). That is, the regional LSH search 710 and/or other components may be implemented at a computing device that is dedicated to hosting the regional LSH search 710. For example, the regional LSH search 710 can be hosted at a computing device with a minimal or "just-enough" operating system. Furthermore, the regional LSH search 710 may be the only, exclusive, or primary software application hosted at the appliance.

Figure 8:
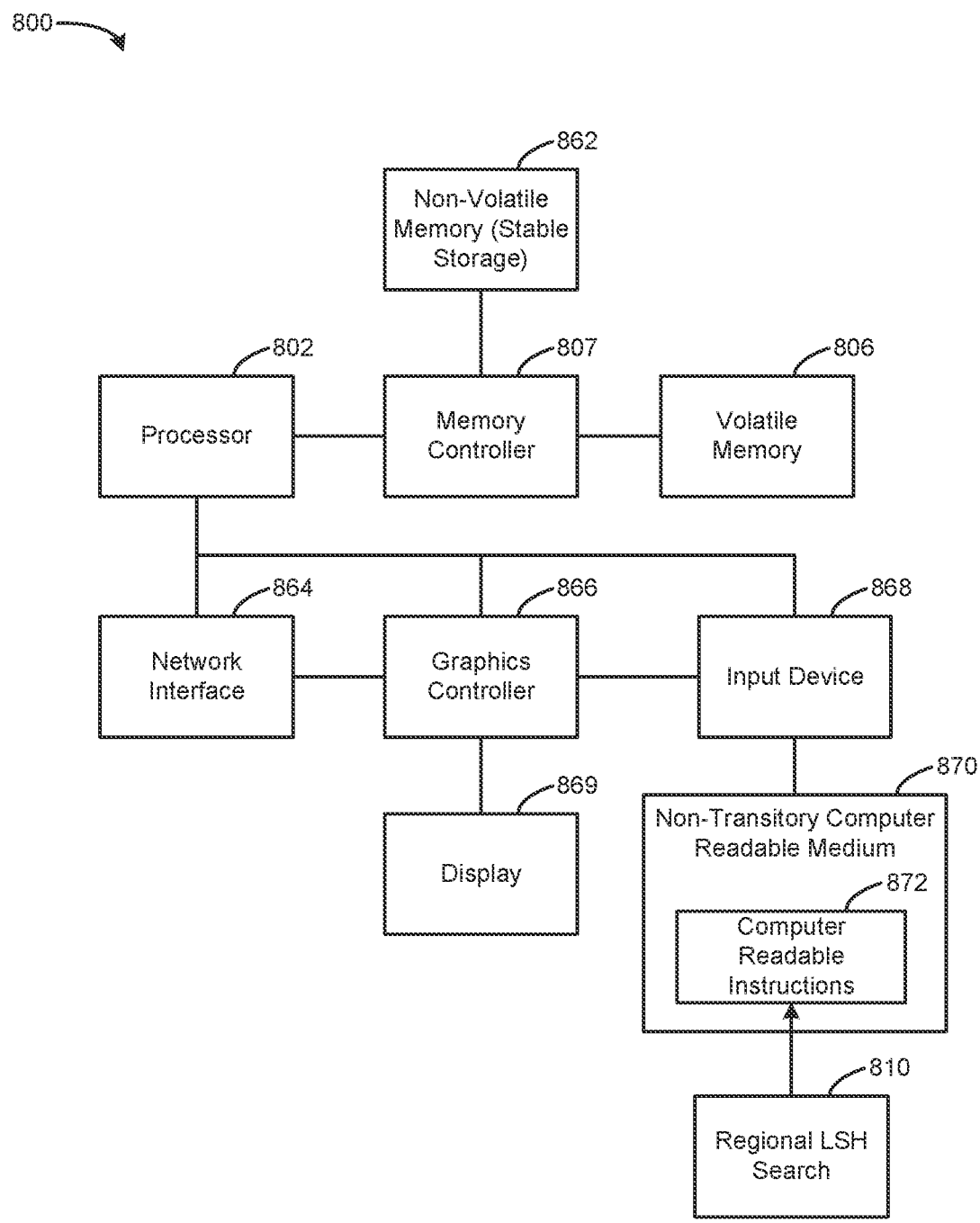
FIG. 8 is a block diagram of a computing system including a regional LSH search according to an example.

FIG. 8 is a block diagram of a computing system 800 including a regional LSH search 810 according to an example. Examples described herein may be implemented in hardware, software, or a combination of both. Computing system 800 may include a processor 802 and memory resources, such as, for example, the volatile memory 806 and/or the non-volatile memory 862, for executing instructions stored in a tangible non-transitory medium (e.g., volatile memory 806, non-volatile memory 862, and/or computer readable medium 870). The non-transitory computer-readable medium 870 can have computer-readable instructions 872 stored thereon that are executed by the processor 802 to implement regional LSH search 810 according to the present examples.

A machine (e.g., computing system 800) may include and/or receive a tangible non-transitory computer-readable medium 870 storing a set of computer-readable instructions 872 (e.g., software) via an input device 868. As used herein, the processor 802 can include one or a plurality of processors such as in a parallel processing system. The memory 806 can include memory addressable by the processor 802 for execution of computer readable instructions. The computer readable medium 870 can include volatile and/or non-volatile memory such as a random-access memory (RAM), magnetic memory such as a hard disk, floppy disk, and/or tape memory, a solid-state drive (SSD), flash memory, phase change memory, and so on. In some embodiments, the non-volatile memory 862 can be a local or remote database including a plurality of physical non-volatile memory devices.

The processor 802 can control the overall operation of the computing system 800. The processor 802 can be connected to a memory controller 807, which can read and/or write data from and/or to volatile memory 806 (e.g., random access memory (RAM)). The processor 802 can be connected to a bus to provide communication between the processor 802, the network interface 864, and other portions of the computing system 800. The non-volatile memory 862 can provide persistent data storage for the computing system 800. Further, the graphics controller 866 can connect to a display 869.

A computing system 800 can include a computing device including control circuitry such as a processor, a state machine, ASIC, controller, and/or similar machine. As used herein, the indefinite articles "a" and/or "an" can indicate one or more than one of the named objects. Thus, for example, "a processor" can include one or more than one processor, such as in a multi-core processor, cluster, or parallel processing arrangement.

The present disclosure is not intended to be limited to the examples shown herein, but is to be accorded the widest scope consistent with the principles and novel features disclosed herein. For example, it is appreciated that the present disclosure is not limited to a particular configuration, such as computing system 800. The various illustrative modules and steps described in connection with the examples disclosed herein may be implemented as electronic hardware, computer software, or combinations of both. Examples may be implemented using software modules, hardware modules or components, or a combination of software and hardware modules or components. Thus, in an example, one or more of the example steps and/or blocks described herein may comprise hardware modules or components. In another example, one or more of the steps and/or blocks described herein may comprise software code stored on a computer readable storage medium, which is executable by a processor.

To clearly illustrate this interchangeability of hardware and software, various illustrative components, blocks, modules, and steps have been described generally in terms of their functionality (e.g., the regional LSH search 810). Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

What is claimed is:

1. A non-transitory computer readable medium having instructions stored thereon executable by a processor to:
   identify a search point contained in geo-located data, the search point being nearest in distance to a query location;
   determine a search region associated with the search point, the search region comprising a plurality of neighbor points contained in the geo-located data that are nearest k points by distance to the search point;
   assign the plurality of neighbor points to corresponding Product Quantization (PQ) pipelines based on PQ point classes including corresponding sets of subspace centroids;
   compare the PQ point classes in the search region with other regions contained in the geo-located data to determine similar regions using a Locality Sensitivity Hashing LSH) regional search heuristic;
   determine a plurality of counts corresponding to a number of subspace centroid matches, by performing vectorization with a vectorized loop in parallel to provide fast performance, the vectorization being provided at a hardware level;
   order the plurality of counts in descending order, corresponding to listing the other regions having the highest similarity first; and
   generate an ordered list of the other regions based on their respective similarities to the search region.

2. The non-transitory computer readable medium of claim 1, further comprising instructions executable by the processor to find similar locations using Locality Sensitivity Hashing (LSH).

3. The non-transitory computer readable medium of claim 2, wherein the LSH is based on a Reconfigurable Inverted Index (Rii) model.

4. The non-transitory computer readable medium of claim 3, further comprising instructions executable by the processor to create the Rii model based on a Product Quantization (PQ) model and geo-located data.

5. The non-transitory computer readable medium of claim 4, further comprising instructions executable by the processor to create the PQ model based on an input subspace and an input code size.

6. The non-transitory computer readable medium of claim 5, further comprising instructions executable by the processor to determine the input subspace and the input code size by using a pareto frontier set.

7. The non-transitory computer readable medium of claim 4, further comprising instructions executable by the processor to encode the PQ model.

8. The non-transitory computer readable medium of claim 4, further comprising instructions executable by the processor to decompose features of the geo-located data into subspaces.

9. The non-transitory computer readable medium of claim 8, wherein centroids represent the representative vectors associated with the subspaces.

10. The non-transitory computer readable medium of claim 1, further comprising instructions executable by the processor to preprocess the geo-located data to determine the k nearest neighbors for the geo-located data.

11. A method of performing searches by comparing regions comprising:
    identifying a search point contained in geo-located data, the search point being nearest in distance to a query location;
    determining a search region associated with the search point, the search region comprising a plurality of neighbor points contained in the geo-located data that are nearest k points by distance to the search point;
    assigning the plurality of neighbor points to corresponding Product Quantization (PQ) pipelines based on PQ point classes including corresponding sets of subspace centroids;
    comparing the PQ point classes in the search region with other regions contained in the geo-located data to determine similar regions using a Locality Sensitivity Hashing LSH) regional search heuristic;
    determining a plurality of counts corresponding to a number of subspace centroid matches, by performing vectorization with a vectorized loop in parallel to provide fast performance, the vectorization being provided at a hardware level;
    ordering the plurality of counts in descending order, corresponding to listing the other regions having the highest similarity first; and
    generating an ordered list of the other regions based on their respective similarities to the search region.

12. The method of claim 11, further comprising finding similar locations using Locality Sensitivity Hashing (LSH).

13. The method of claim 12, further comprising basing the LSH on a Reconfigurable Inverted Index (Rii) model.

14. The method of claim 13, further comprising creating the Rii model based on a Product Quantization (PQ) model and geo-located data.

15. The method of claim 14, further comprising creating the PQ model based on an input subspace and an input code size.

16. The method of claim 15, further comprising determining the input subspace and the input code size by using a pareto frontier set.

17. The method of claim 14, further comprising encoding the PQ model.

18. The method of claim 14, further comprising decomposing features of the geo-located data into subspaces.

19. The method of claim 18, wherein centroids represent the representative vectors associated with the subspaces.

20. The method of claim 11, further comprising preprocessing the geo-located data to determine the k nearest neighbors for the geo-located data.

\* \* \* \* \*